Patented May 9, 1933

1,907,444

UNITED STATES PATENT OFFICE

GUSTAV REDDELIEN AND WERNER MÜLLER, OF LEIPZIG, GERMANY, ASSIGNORS, BY MESNE ASSIGNMENTS, TO AGFA ANSCO CORPORATION, OF BINGHAMTON, NEW YORK, A CORPORATION OF NEW YORK

N-HYDROXYETHYL DERIVATIVES OF NUCLEAR SUBSTITUTION PRODUCTS OF 4-AMINO-1-HYDROXYBENZENE

No Drawing. Application filed October 2, 1928, Serial No. 309,887, and in Germany November 12, 1927.

The present invention relates to the new N-hydroxyethyl derivatives of the nuclear substitution products and homologues of 4-amino-1-hydroxybenzene and to the manufacture thereof.

The corresponding compounds not substituted in the benzene nucleus are not claimed in the present specification; they are the subject matter of our U. S. Patent No. 1,712,716.

The new bases are made by condensing a highly active derivative of ethane containing one atom of oxygen and containing in its molecule the atom figuration

comprising halogen hydrin of glycol and ethylene oxide at ordinary or raised temperature with a nuclear substitution product or homologue of 4-amino-1-hydroxybenzene; in some cases it is advantageous that an agent that binds acid should be present and there may also be used a diluent, a solvent or a catalyzer.

The following examples illustrate the manufacture of the new compounds, the parts being by weight:—

*Example 1.*—143 parts of 2-chloro-4-amino-1-hydroxybenzene are suspended in 2000 parts of boiling water together with 180 parts of calcium carbonate and, while stirring the mixture, 200 parts of ethylene chlorhydrin are added. The whole is heated to boiling and then boiled in a reflux apparatus until the odor of ethylene chlorhydrin disappears. By adding 165 parts of sodium carbonate calcium carbonate is precipitated. It is filtered off after repeated boiling and the filtrate is allowed to cool. The new base, 2-chloro - 4 - [di(hydroxyethyl)]amino - 1 - hydroxybenzene is extracted by shaking the filtrate with ethylacetate and, after evaporating the latter, is obtained in the form of a brown oil which soon solidifies. It is purified by recrystallization from water, alcohol, ethylacetate or the like. There are obtained in this manner colorless crystals of melting point 112° C. The base is freely soluble in alkalies, acids, boiling water, organic solvents, such as alcohol, ether, acetone or ethylacetate; it is less soluble in cold water, very little soluble in benzene and chloroform.

*Example 2.*—143 parts of 2-chloro-4-amino-1-hydroxybenzene are suspended in 1000 parts of water and the suspension is heated, while stirring, to about 70° C. At this temperature ethylene-oxide is introduced until the 2-chloro-4-amino-1-hydroxbenzene has been completely converted into 2-chloro-4 - [di(hydroxyethyl)]amino-1-hydroxybenzene. After boiling, the whole is filtered, whereby a little impurity is separated, and the filtrate is freed from water in a vacuum. The remaining dark-colored oil solidifies on cooling. The product is worked up as described in Example 1.

*Example 3.*—143 parts of 2-chloro-4-amino-1-hydroxybenzene are heated with 1000 parts of water and 60 parts of calcium carbonate, while stirring, at 80° C. and there are then added 81 parts of ethylenechlorhydrin. By heating to boiling and boiling until the ethylenechlorhydrin is decomposed, the reaction is shortly completed. Calcium carbonate is precipitated by adding 55 parts of sodium carbonate, and the whole is diluted with about 500 parts of boiling water and filtered. The cooled filtrate is extracted with ethylacetate which dissolves 2-chloro-4-(hydroxyethyl)-amino-1-hydroxybenzene. By distilling the extracting agent the base is left as an oily residue, which is dissolved in about 250 parts of alcohol and precipitated in the form of an almost colorless sulfate by addition of concentrated sulfuric acid. The product can be recrystallized from a small quantity of hot water or dilute alcohol and it is then in the form of colorless thick prisms or long slender needles. The free base is obtained by cautious neutralization of the aqueous solution of the sulfate by means of dilute sodium carbonate solution. It forms colorless crystals which melt at 67–68° C. The 2-chloro-4-(hydroxyethyl) amino-1-hydroxybenzene is freely soluble in caustic alkalies and acids; less soluble in alkali-carbonate solution and in water. It is freely soluble in the usual organic solvents, such as alcohol, ether, ethylacetate, but very little soluble in benzene or chloroform. The sulfate appears to be the acid sulfate of the base.

*Example 4.*—143 parts of 2-chloro-4-amino-1-hydroxybenzene are mixed with 1000 parts of water and 49 parts of concentrated sulfuric acid, the mixture is heated with stirring, to 60° C., and at this temperature ethyleneoxide is introduced to make the hydroxyethyl-derivative. When the first traces of the di-(hydroxyethyl)-amino-compound can be recognized the introduction of ethylene-oxide is interrupted. After boiling, neutralization with sodium carbonate and filtration, the filtrate is allowed to cool and is again filtered, the final filtrate being extracted with ethyl acetate. The further working up follows the prescription of Example 3. The purified base is identical with that obtained as described in Example 3.

*Example 5.*—153 parts of 4-amino-1-hydroxybenzene-2-carboxylic acid are intimately stirred with 300 parts of ethylenechlorhydrin, whereupon, after warming to about 50° C., there are dropped in, while stirring, 290 parts of 10 N-sodium-hydoxide solution. As soon as the mass is liquefied the temperature is gradually raised, so that by the time the last quantity of sodium hydroxide is added the boiling point has been attained. The whole is now made feebly acid by means of a mineral acid, the water and excess of ethylenechlorhydrin are distilled in a vacuum and from the residue the 4-[di(hydroxyethyl)]-amino-1-hydroxybenzene-2-carboxylic acid is extracted by means of hot alcohol. On cooling, the product separates from the solution in nearly colorless crystals, which decompose, while foaming, at about 183° C. The acid is easily soluble in water, acids and alkalies. It is less soluble in alcohol and almost insoluble in ether or acetone.

The same body is obtained when ethyleneoxide is passed into a suspension of 153 parts of 4-amino-1-hydroxybenzene-2-carboxylic acid in 1000 parts of water and 50 parts of a 10 N-sodium hydroxide solution until the 4-[di(hydroxyethyl)] amino - 1 - hydroxybenzene-2-carboxylic acid has been formed. The product is worked up as described in the preceding paragraph.

*Example 6.*—153 parts of 4-amino-1-hydroxybenzene-2-carboxylic acid are heated to 80° C. with 165 parts of sodium carbonate and 1500 parts of water, and the whole is mixed while stirring with 120 parts of ethylenechlorhydrin, added as a whole. By heating the mixture gradually to boiling and boiling for several hours in a reflux apparatus the reaction is completed. The mass is then neutralized by means of dilute hydrochloric acid, filtered and the filtrate freed from water in a vacuum. The residue is extracted several times with dilute alcohol and there is thus obtained 4-(hydroxyethyl)amino-1-hydroxybenzene-2-carboxylic acid in almost colorless crystals which, when recrystallized from hot water or dilute alcohol, are pure and decompose at 206° C. The new acid is but little soluble in cold water, alcohol or the like but more freely soluble in hot water. It dissolves freely in acids and caustic alkalies.

The same new compound is obtained by passing ethylene oxide into a suspension of 153 parts of 4-amino-1-hydroxybenzene-2-carboxylic acid, 75 parts of sodium carbonate and 1000 parts of water at about 70° C. until the first traces of 4-[di(hydroxyethyl)]-amino-1-hydroxybenzene-2-carboxylic acid are to be recognized. Further working is as described in the preceding paragraph.

*Example 7.*—123 parts of 4-amino-3-methyl-1-hydroxybenzene are mixed with 1000 parts of water and, while stirring at about 70° C., a rapid current of ethylene-oxide is passed through the mixture. After a short time 4-[di(hydroxyethyl)]-amino-3-methyl-1-hydroxybenzene is formed. After boiling, filtering and eliminating water from the filtrate in a vacuum there is obtained an oily residue which solidifies and may be recrystallized from water with addition of some sodium bisulfite and carbon. The thick colorless crystals thus obtained melt at 108–109° C. They are freely soluble in hot water, the usual organic solvents, acids and alkalies.

The same body may be obtained in the manner described by means of ethylenechlorhydrin.

*Example 8.*—123 parts of 4-amino-3-methyl-1-hydroxybenzene are heated with 2000 parts of water and 90 parts of calcium carbonate to 80–90° C. and 120 parts of ethylenechlorhydrin are added. The whole is heated to boiling and boiled for a short time in a reflux apparatus until the reaction is complete. After addition of 55 parts of sodium carbonate, the calcium carbonate formed is filtered off and from the cooled filtrate the 4-(hydroxyethyl)amino-3-methyl-1-hydroxybenzene is extracted by means of ethylacetate. It is a brown oil, which gradually solidifies. The oil is dissolved in alcohol and the oxalate of the new base is precipitated, in the form of colorless crystals, from the alcoholic solution by adding the calculated quantity of oxalic acid dissolved in alcohol. The oxalate is freely soluble in hot water and less soluble in cold water, so that it may easily be recrystallized from water. The free base may be extracted from solution of its salts, made alkaline with sodium carbonate, by shaking with ethylacetate, in the form of a brownish oil which soon solidifies to colorless crystals. These latter can be recrystallized from dilute sodium chloride solution; the crystals are colorless but soon become brown in air; they melt at 80–82° C. The base dissolves freely in water, alkalies and acids, more sparingly in salt solution and freely in the known organic solvents. It combines with half a molecular proportion of oxalic acid.

The new compound is also obtained by treating 4-amino-3-methyl-1-hydroxybenzene with ethylene oxide and working up the product as described in the preceding paragraph.

What we claim is:—

1. An N-substituted 4-amino-1-hydroxybenzene of the general formula

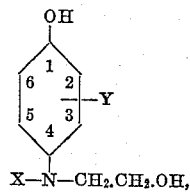

wherein X represents hydrogen or the group —CH$_2$—CH$_2$—OH, and wherein Y represents chlorine, methyl or COOH the free bases forming colorless crystallized products soluble in caustic alkalies and acids.

2. An N-substituted 4-amino-1-hydroxybenzene of the general formula

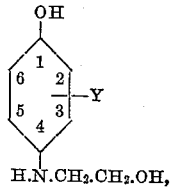

wherein Y represents chlorine, methyl or COOH, the free bases forming colorless crystallized products soluble in caustic alkalies and acids.

3. 4-(hydroxyethyl)amino-3-methyl-1-hydroxybenzene forming in the pure state colorless crystals which melt at 80–82° C. being freely soluble in water, alkalies and acids, more sparingly in salt solution and freely in the known organic solvents, the base combining with half a molecular proportion of oxalic acid.

4. The 4-(hydroxyethylamino-1-hydroxybenzene-2-carboxylic acid forming in the pure state colorless crystals decomposing at 206° C., little soluble in cold water and alcohol, more freely soluble in hot water and soluble in acids and caustic soda.

5. The 2-chloro-4-(hydroxyethyl)amino-1-hydroxybenzene forming in the pure state colorless crystals melting at 67 to 68° C., being freely soluble in alcohol, ether, ethylacetate, very little soluble in benzene or chloroform, freely soluble in caustic soda and acids, less soluble in alkali carbonate solution and in water and forming with sulfuric acid an acid salt.

In testimony whereof, we affix our signatures.

GUSTAV REDDELIEN.
WERNER MÜLLER.